(12) United States Patent
Qian

(10) Patent No.: US 7,559,264 B2
(45) Date of Patent: Jul. 14, 2009

(54) LINEAR RECIPROCATING PROPULSION APPARATUS

(76) Inventor: Zufan Qian, 6-1-101 Jia Shan Xin Village Gong Shu District, Hangzhou, Zhejiang (CN) 310014

(*) Notice: Subject to any disclaimer, the term of this patent is extended or adjusted under 35 U.S.C. 154(b) by 719 days.

(21) Appl. No.: 10/513,963

(22) PCT Filed: May 23, 2003

(86) PCT No.: PCT/CN03/00384

§ 371 (c)(1),
(2), (4) Date: Jan. 18, 2005

(87) PCT Pub. No.: WO2004/011325

PCT Pub. Date: Feb. 5, 2004

(65) Prior Publication Data

US 2006/0226627 A1   Oct. 12, 2006

(30) Foreign Application Priority Data

Jun. 17, 2002   (CN) .............................. 02 1 24508

(51) Int. Cl.
*F16H 27/02* (2006.01)
(52) U.S. Cl. ........................................................ 74/89
(58) Field of Classification Search ............... 474/145, 474/152, 160, 273; 280/230, 236, 241, 252, 280/253, 257, 258; 74/128, 130, 561
See application file for complete search history.

(56) References Cited

U.S. PATENT DOCUMENTS

| 3,891,235 | A | | 6/1975 | Shelly | |
|---|---|---|---|---|---|
| 4,169,609 | A | | 10/1979 | Zampedro | |
| 5,236,211 | A | | 8/1993 | Meguerditchian | |
| 6,090,002 | A | * | 7/2000 | Farmos | 474/152 |
| 6,113,510 | A | * | 9/2000 | Farmos | 474/160 |
| 6,129,646 | A | | 10/2000 | Farmos | |
| 6,237,928 | B1 | * | 5/2001 | Islas | 280/252 |
| 6,412,802 | B1 | * | 7/2002 | Kugel et al. | 280/252 |
| 7,048,290 | B2 | * | 5/2006 | Paquette | 280/252 |

FOREIGN PATENT DOCUMENTS

FR            2 544 042 A     10/1984

* cited by examiner

*Primary Examiner*—Vicky A Johnson
(74) *Attorney, Agent, or Firm*—Jacobson Holman PLLC

(57) ABSTRACT

The present invention relates to a linear reciprocating driving apparatus. It includes a sliding assembly, a slave chain-engaging and reversing mechanism, a flying wheel, a driven sprocket, a driving chain, and a guide column. The sliding assembly is arranged on the framework of the propulsion apparatus to be activated by a rider. Also there is provided a slave chain-engaging and reversing mechanics with compensation means. The propulsion apparatus can obtain satisfying results and high efficiency. The invention can be applied to various manually powered vehicle and watercraft. They are mainly used for communication to substitute walking and physical exercise.

4 Claims, 5 Drawing Sheets

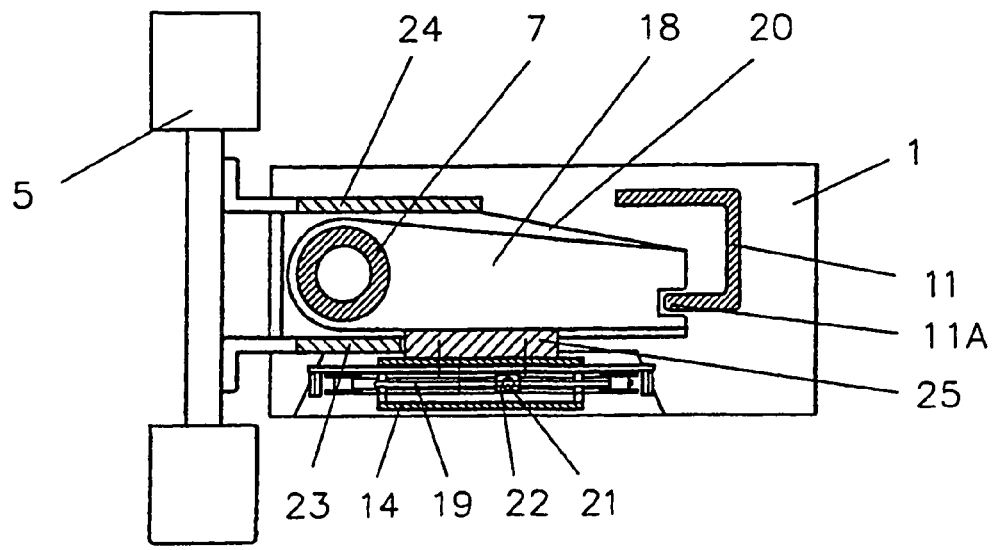
FIG. 2
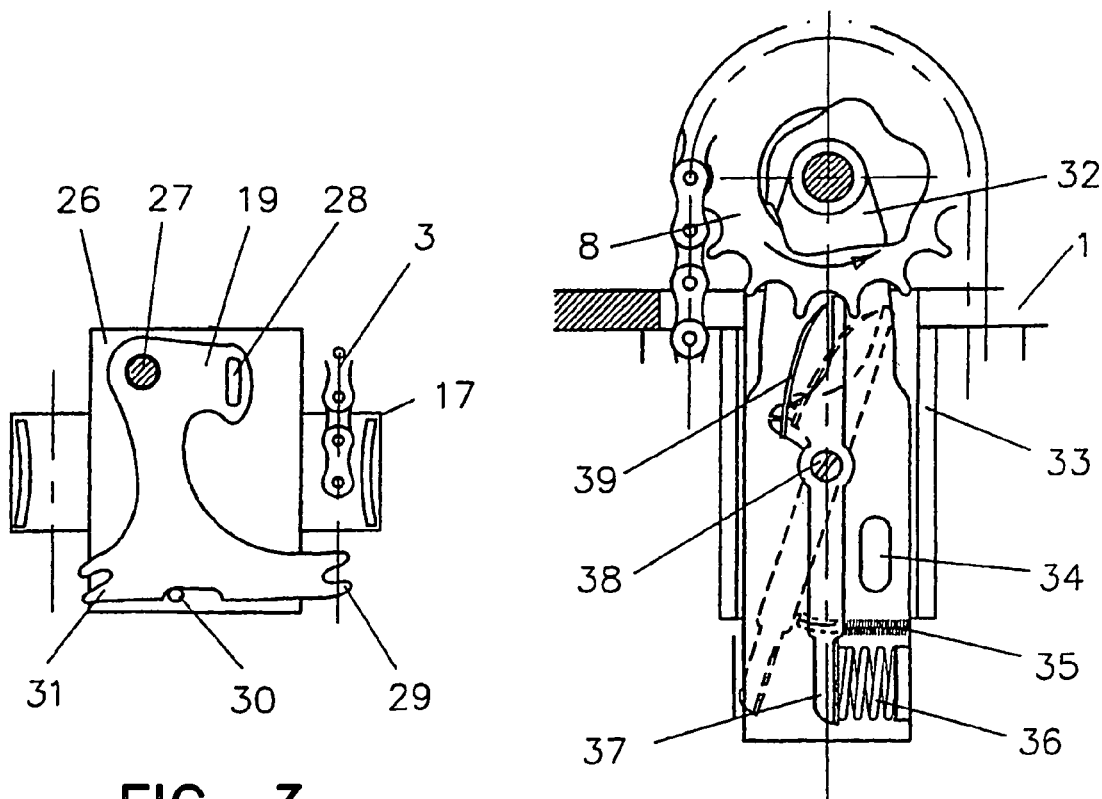
FIG. 3
FIG. 4

LINEAR RECIPROCATING PROPULSION APPARATUS

BACKGROUND OF THE INVENTION

1. Field of the Invention

The present invention relates to a driving apparatus and, in particular, to a driving apparatus that is characterized by a single endless chain and manually powered linear propulsion, mainly used for non-motorized vehicles or vessels with stable support.

2. Description of Prior Art

Vehicles and vessels need to be driven by power. Manually powered devices are commonly used in non-motorized wheel vehicles, among which some have linear reciprocating driving mechanisms for the purpose of substituting for walking rather than entertaining or exercising. Their structures are complex. Few can be put into actual use.

Chinese Pat. No. 99108216.8 (CN1275511A) discloses a bicycle with linear movement of pedaling. It has a toothed rack driving mechanism affixed on a tilted square frame. There are two toothed racks in a sliding groove. Depression of either pedal will cause the racks to move, thus draw sprocket wheels and a chain, and transfer the power to a rear driving wheel. A reset gear is used for reset control.

Other related patents are U.S. Pat. No. 6,129,646 (Farmos), U.S. Pat. No. 5,236,211 (Meguerditchian), Fr,A,2544052 (MICHAUDETG), U.S. Pat. No. 4,169,609 (Zsmpedro), and U.S. Pat. No. 3,891,235 (Shelly). All the above-mentioned references disclose open technical designs that employ double endless chain mechanisms for alternate propelling. The operating process is simple. However it needs two sets of components to work alternately. The structure is very complicated and there are some difficulties in processing and installation.

Chinese Pat. No. 99123093.0 (CN1298824A) discloses a bicycle with a rocking crank. Its driving mechanism adopts two prime cranks on the left and right for pedal driving. The rear end of the crank is connected with the shaft end of a rear wheel with a driven crank linked in between, to drive a small sprocket and form a secondary transmission together with a coaxial large sprocket. Finally, the driving power is transmitted to the driving shaft of the rear wheel. Its method of operation approximates the linear movement of pedaling. But with too many transmission links, its efficiency is unavoidably reduced.

Chinese Patent Application (Application No. 01132621.2) discloses "a tractive chain-gripping cycle" including the structure of a steel wire rope traction. However, the steel wire rope will curl in the course of transmitting torque via a small pulley and the curl will affect normal operation of the cycle. In addition, the mechanism sometimes fails in reversing.

Obviously, the mechanism of the linear pedaling type shall first ensure its smooth and continuous operation, as well as the convenience during manufacture, especially avoid excessive transmission links and reduce idle runs so as to improve transmission efficiency.

SUMMARY OF THE INVENTION

The present invention relates to a tractive linear driving apparatus with good integration and structure quality which can be conveniently equipped on manually-powered carriers. The apparatus has considerable flexibility in the manner of applying force, greater scope for development and design, and comparatively higher transmission efficiency.

The present invention of tractive linear reciprocating driving apparatus consists of a (main) frame as a fixed member; a sliding assembly incorporating a chain-gripping and reversing mechanism as a movable member; and a single endless chain, and its sprocket wheel and flywheel as a transmission member. The shaft of a flywheel outputs power and achieves mechanical transmission.

This tractive linear reciprocating driving apparatus comprises a sliding assembly, a slave chain-gripping and reversing mechanism, a flywheel, a driven sprocket, a chain and a main guide column, said apparatus comprising:

a main frame that consists of a guide column, an auxiliary frame column and main frame endplates, the two ends of the frame are affixed with the flywheel and the driven sprocket with a single endless chain installed and linked in between. Its guide column and auxiliary frame column used for directional linear sliding are installed on the side of the plane formed by the endless chain. A sliding assembly for linear driving and a slave chain-gripping and reversing mechanism are installed on the guide column. The upper and lower slide bars of the sliding assembly are mounted on the guide column for sliding upwards and downwards along the guide column. The pedals and handpowered rods are fixed to plates on both sides of the sliding assembly for driving forces to apply thereon;

The apparatus is characterized by:

1) the slave chain-gripping and reversing mechanism has a chain-gripping box located in the plane of the chain ring; the upper and lower slave slide bars connected with the chain-gripping box are mounted on the guide column. A chain-gripping tooth plate is provided in the chain-gripping box. One end of the chain-gripping tooth plate that is subject to force is float-connected to the sliding assembly via a connector. The connector consists of a pull-up rod, a pull-down rod and a connecting rod. The tooth plate in said chain-gripping box has two chain-gripping teeth to engage said chain on both directions to work jointly with both chain-retaining boards to engage the chain alternatively.

2) a reversing compensation means is provided for the slave chain-gripping and reversing mechanism to reverse, the reversing compensation means comprising a resilient member contacting the front of the tooth of the driven sprocket directly or indirectly in opposite direction, and reserving a space or clearance for movement.

The reversing compensation means is a mobile mechanism for the purpose of elastic contact located on or beneath the slave sprocket. An arm of the reversing compensation means is in contact with the front surface of the tooth of the driven sprocket elastically under the action of its resilient member. To stop or prevent the reversing movement of the chain tooth of the driven sprocket, said arm may press the chain tooth under the action of a spring, thus realize smooth reverse and a certain buffering result.

The reversing compensation means is a modified single-stage flywheel, in which there is a structural member for transmission between a leaf spring and a chain tooth. The leaf spring supports the rear end of a jack to make it elastically contact firstly with the front of trapezoid-shape rackets and then indirectly with the front surface of the chain tooth of an outer hull of the flywheel.

The tractive linear reciprocating driving apparatus of this invention has the following positive effects.

1. Since it adopts a single endless chain structure, the driving apparatus of the present invention has a more compact structure and is convenient in manufacturing and installation. In application, the whole apparatus can be installed directly in combination with the driving wheel or an axle of a vehicle or a boat. Linearly is applying of force produces higher efficiency. Even if an additional level of chain transmission is added, the effect is still quite good.

2. This driving apparatus is used mainly for equipping the exercising apparatus, due to the feature of the convenient and natural method of applying force. By simultaneously pedaling with his foot and pulling with his hand in operation, a user can obtain a comprehensive exercise effect. It is applicable to a one-man, two-man or multi-man manually-powered vehicle or boat, as well as transportation means or for use in sports competition.

3. Since the sliding assembly can adapt to the change of different angles of force applied thereto, it provides more room for design to meet different seating postures requirements and satisfy various needs in developing application fields and products diversification.

4. Since the present apparatus is more suitable for installing in a stably supported vehicle or boat, it has the features of convenience, safety and comfort. It can be operated by a user in chair and thus suitable for the old, weak and disabled for relaxation and entertainment.

BRIEF DESCRIPTION OF THE DRAWINGS

FIG. 2 is a top plan view of the cross section along line A-A.

FIG. 3 is a structural diagram of the swing chain-gripping tooth plate.

FIG. 4 is a structural diagram of a reversing compensation means.

Figure 1:
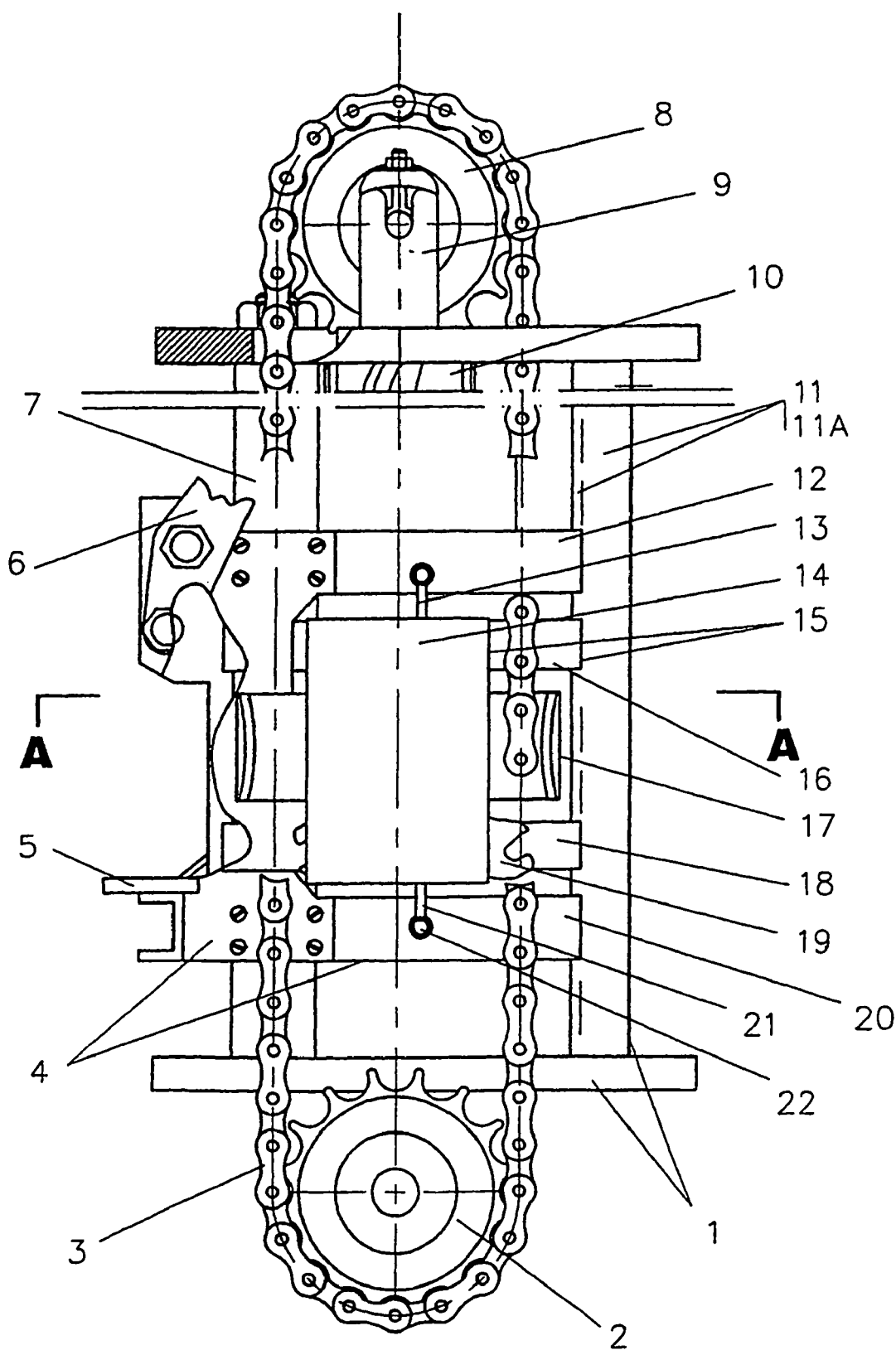
FIG. 1 is a structural diagram of the present invention.

In the above-mentioned drawings, the following reference numbers represent: 1. main frame 2. flywheel 3. chain 4. sliding assembly 5. pedal 6. hand-pulling rod 7. guide column 8. driven sprocket 9. sprocket support 10. reversing compensation means 11. auxiliary frame pillar 11A. guide tongue 12. upper slide bar of the sliding assembly 13. pull-up rod 14. chain-gripping box 15. slave chain-gripping and reversing mechanism 16. slave upper slide bar 17. chain-retaining board 18. slave lower slide bar 19. chain-gripping tooth plate 20. lower slide bar of the sliding assembly 21. pull-down rod 22. nose of connecting rod 23. front butt plate of the sliding assembly 24. rear butt plate of slipping module 25. transitional coupling plate 26. bottom plate of chain-gripping box 27. short shaft 28. hole to connect rod nose 29. chain-gripping teeth 30. limit pin 31. chain-engaging teeth 32. hanging plate 33. groove frame 34. positioning hole 35. tension spring 36. strong compressed spring 37. arm 38. arm shaft 39. damp spring leaf 40. guide groove 41. jogger 42. guide rail of plate column form 43. chute 44. chain tooth 45. leaf spring 46. chute wall 47. compensation clearance 48. mobile top block 49. jack spring 50. jack 51. trapezoid-shape ratchet 52. steel bead 53. seat 54. vehicle frame 55. regulating wheel 56. foot-controlled rudder pole 57. driving wheel 58. follower wheel 59. handle bar 60. rod handle 61. connecting rod 62. main (rear) buoy 63. side buoy 64. front buoy 65. propeller

DETAILED DESCRIPTION OF THE PREFERRED EMBODIMENT

A better understanding of the invention will be obtained by referring to the accompanying drawings.

FIG. 1 illustrates a tractive linear reciprocating driving apparatus of this invention. It comprises a main frame 1 that consists of, a guide column 7, an auxiliary frame 11 and frame endplates. Connected to one end of the main frame is a flywheel 2 with driving sprocket and to the other end is a slave sprocket 8 with the same diameter, with a single endless chain installed in between. The guide column and the auxiliary frame column are installed on the side of the chain ring plane (backwards in the figure). A sliding assembly 4 and a slave chain-gripping and reversing mechanism 15 are installed on the guide column. The main frame may be installed in different ways for the different applications, and can be installed in the appropriate position of a vehicle or a boat through connecting pieces. In this embodiment, the upper and lower slide bars 12, 20 of the sliding assembly are mounted on the guide column 7 to slide upwards and downwards along the guide column with a guide tongue 11A. Pedal 5 and hand-pulling rod 6 are affixed to rear butt plate of the sliding assembly so as to apply force with foot and hand, respectively. The chain gripping box 14 in said slave chain-gripping and reversing mechanism operates in the plane of the chain ring. The chain-gripping box 14 is connected with the upper and lower slave slide bars 16, 18 and mounted together on the guide column 7. The chain-gripping box 14 is provided with a chain-gripping tooth plate 19 that is float-connected by a pull-up rod, a pull-down rod, a nose of a connecting rod and to the sliding assembly. The plate follows up the upward or downward movement of the sliding assembly and controls the activity of chain-gripping. In the figure, flywheel 2—the driving sprocket to output power, turns the force applied thereto in linear way to shaft torque to operate the driving wheel. The chain-retaining board 17 with an arc projection to retain the chain is used to limit the position of chain in reversing and guarantee said chain-gripping tooth to engage chain smoothly. Reversing compensation means 10 guarantees the smooth operation of the slave chain-gripping and reversing mechanism. As shown in the figure, a chain-tensioning device is provided on the sprocket support 9 to adjust the tensioning of the chain by drawing slave sprocket shaft. The conventional structure of a bicycle chain tensioning device is adopted for this embodiment.

FIG. 2 illustrates a diagrammatic top view of this invention. Underneath is a bottom plate of the main frame 1, the guide column 7 and the auxiliary frame pillar 11 on both sides. Pedal 5 is on the left and connecting the front butt plate of the sliding assembly 23, 24 and the lower slide bar 20. The chain-gripping box 14 is shown in cross sectional view comprising chain-gripping tooth plate 19, the pull-down rod 21 and a flywheel hidden underneath. The chain-gripping box 14 connects the upper and lower slave slide bars with transitional coupling plate 25. As shown in the figure, a slave lower slide bar 18 and a lower slide bar of the sliding assembly 20 match with the jaw at a guide tongue 11A on the right. The relation of connection between lower slide bar 20 and two butt plates 23, 24 of the sliding assembly incorporating a hand-pulling rod 6 and a pedal 5 is clearly shown.

FIG. 3 illustrates the structure of the chain-gripping assembly in said chain-gripping box. It belongs to a swing chain-gripping mechanism. A chain-gripping tooth plate 19 is fixed on a bottom plate 26 by a short shaft 27 with a hole 28 to connect the rod nose. When the tooth plate being drawn upwards and downwards, it swings and reverses the direction. There are two chain-gripping teeth 29, 31 toward two opposite directions on said chain-gripping tooth plate 19. The tooth plate and the chain-retaining board 17 with a chain-retaining arc projection, cooperate with chain 3 and activate alternately to perform automatic slave reversing. There is a limit pin 30.

The course of slave reversing control is as follows: when the nose of the connecting rod 22 is drawn downwards, the chain-gripping teeth 31 will insert in chain-links on the left to carry said chain to go downwards; when drawn upwards, the chain-engaging teeth 31 will disengage the chain and the chain-engaging teeth 29 will insert in chain on the right to carry said chain to go upwards. There is a limit pin 30.

FIG. 4 illustrates the reversing compensation means installed on the lower part of the slave sprocket on the frame. The hanging plate 32 of said device is connected with a slave sprocket 8 by a coaxial coupling. An arm 37 is rotatable around the arm axle 38 in the hanging plate 32. The upper arm end makes straightforward contact with the sprocket teeth. The lower arm end connects a tension spring 35, enabling the upper arm end to contact the front surface of the sprocket tooth directly and always engage said toothsurface. In reversing of direction, when the chain-gripping tooth plate 19 below moves towards opposite side, a compensation motion in opposite direction occurs to solve the problem that the chain-gripping teeth cannot be inserted in the chain link hole for an instant, and ensures smooth reversing. A strong compressed spring 36 acts as a buffer in the course of reversing direction. 38 is an arm axle for securing the arm. A positioning hole 34 is used for adjusting mounting position. 39 is a damp spring leaf. 33 is a fixed groove frame.

Figure 5:
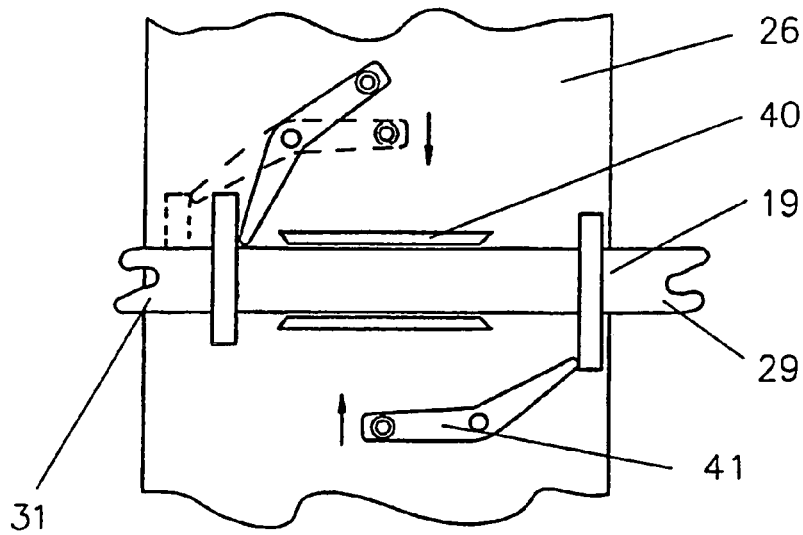
FIG. 5 is a structural diagram of a linear moving chain-gripping tooth plate.

FIG. 5 illustrates another embodiment of the chain-gripping tooth plate with linear motion structure. The chain-gripping tooth plate reverses its direction by moving in the guide groove 40. In addition, joggers 41 are added.

Figure 6:
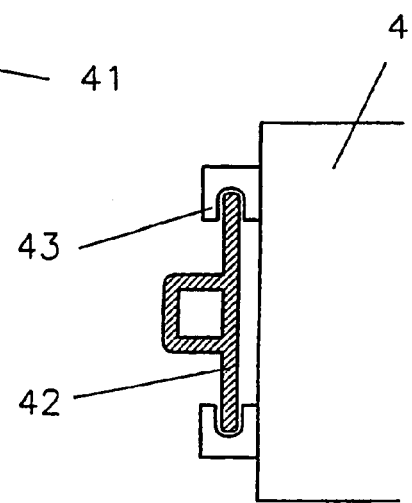
FIG. 6 is a structural diagram of another type of sliding assembly.

FIG. 6 illustrates another embodiment of the guide column structure wherein 4 is the sliding assembly and the slave chain-gripping and reversing mechanism is also located therein. 42 is a guide rail of plate column form and 43 is a chute.

Figure 7:
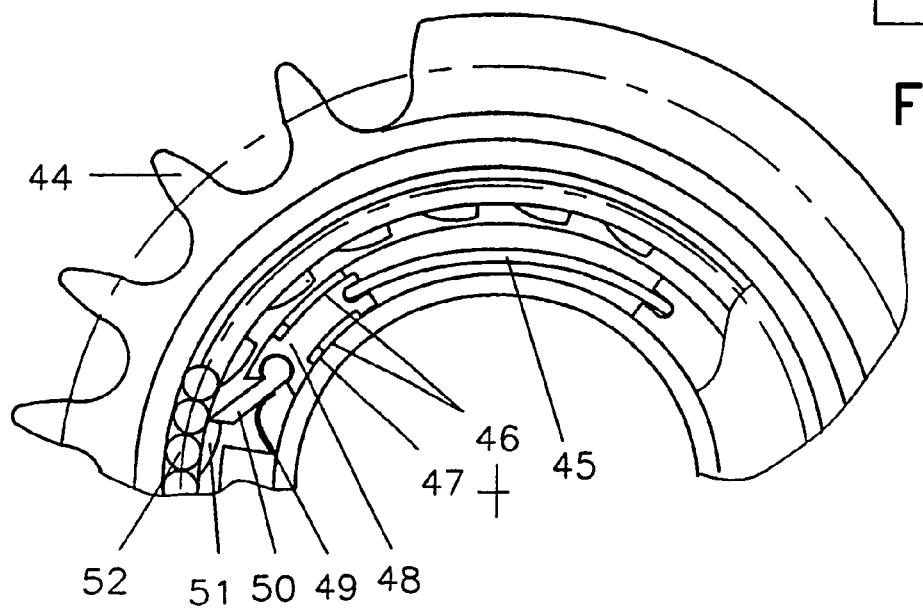
FIG. 7 is a structural diagram of reversing compensation means integrated with a driven sprocket.

FIG. 7 illustrates a reverse compensation means modified from a single-stage flywheel of a conventional bicycle. It can function as a slave sprocket or a flywheel. The figure shows a part of the flywheel case in which 44 is a chain tooth in the outskirt of the outer hull that incorporates the trapezoid shape ratchets 51 in the inner margin of said outer hull 4. A bead path with steel beads installed therein is located on both sides of said ratchets. A jack 50 (or chaplet) supports the inner side of said ratchet to force the outer hull only to be in unidirectional rotation. A jack spring 49 (or chaplet spring) forces said jack to prop up and always be in a working condition. A flywheel base and a bottom cover plate form an inner hull installed on the drive shaft. Originally, the flywheel performs only circular motion. There is no reversing or compensation problem. To adapt to the reversing function in this tractive linear reciprocating driving apparatus, a mobile top block 48 is added in a jack groove of the inner hull, which is between the original jack and the fixed block to support the jack, leaving an appropriate clearance (length) 47 for reversing compensation. 46 is the chute wall. A leaf spring 45 is provided behind said mobile top block. The leaf spring bends when said jack presses said ratchet. When in use, the compensator inner hull is fixed. During reversing, the leaf spring thereof rebounds and presses said jack to provide a compensation shift in the opposite direction and carries out the insertion of the teeth of the chain-gripping tooth plate into the chain hole during said shift so as to avoid instant failing of insertion and guarantee a smooth reversing.

FIGS. 8, 9, 10 and 11 are embodiments of three different applications of this invention.

Figure 8:
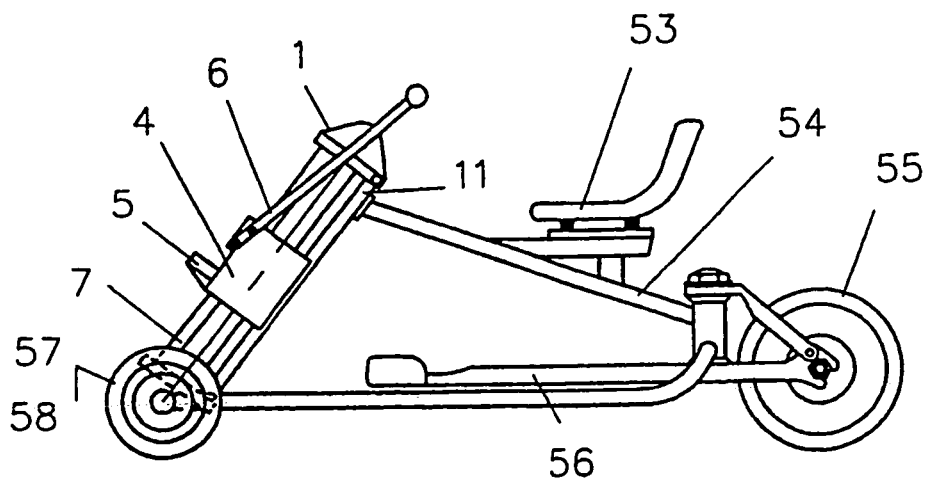
FIG. 8 is a structural schematic diagram of one-man driving tricycle of a first embodiment.
Figure 9:
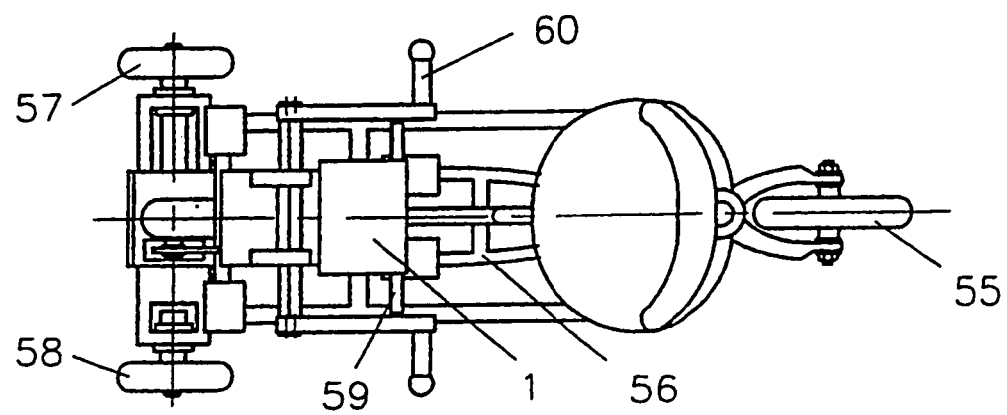
FIG. 9 is a top plan view of the embodiment in FIG. 8.

FIGS. 8 and 9 illustrate structure of a one-man manually-powered tricycle that comprises a carriage 54, a regulating wheel 55, a driving wheel 57, a follower wheel 58, a pedal 5, a seat 53, handlebar, as well as the transmission and brake devices. The conventional mechanism is used for its brake device. The driving wheel is in the front to the right. The regulating wheel is in the back. The driving apparatus is installed on the carriage in front of the seat. Connected to driving apparatus 1 are the pedal, rod handles 60, handle bar 59 and a foot-controlled rudder pole 56 with positions for two feet. In this embodiment, both hands and feet can be used simultaneously, with one foot controlling direction. On the basis of this embodiment, a two-man manually-powered tricycle can be developed simply by widening the carriage and the seat. A conventional brake can also be used.

The following explains the working procedure of the tractive linear reciprocating driving apparatus of this invention as shown in the embodiment of said one-man tricycle.

1. After seated, a user controls regulating wheel with one foot, pedals with the other foot, grips the rod handle with one hand to be ready for lifting and holds the handle bar with the other hand.

2. When pedaling by the user, the sliding assembly 4 goes downwards along a straight line, through the nose of the connecting rod 22, drives the pull-down rod 21 to enable the chain-gripping teeth 31 of the chain-gripping tooth plate 19 to insert into the left chain. By continuously applying force by the user, the flywheel 2 operates and the driving wheel rotates to drive the tricycle forwards (to the left in the figure).

3. When lifting the rod with hand by the user, the sliding assembly 4 goes upwards along a straight line and through the pull-up rod 13 enables chain-gripping teeth 29 of the chain-gripping tooth plate 19 to insert in the right chain. By continuously applying force by the user, flywheel 2 rotates in original direction and the driving wheel rotates to drive the tricycle forwards (to the left in the figure).

4. When stopping applying force by the user during pedaling with his/her foot and lifting with his/her hand, the tricycle keeps running forward by inertia.

5. Repeat above-said operation of stepping with the foot and lifting with the hand, the tricycle keeps running forward.

Figure 10:
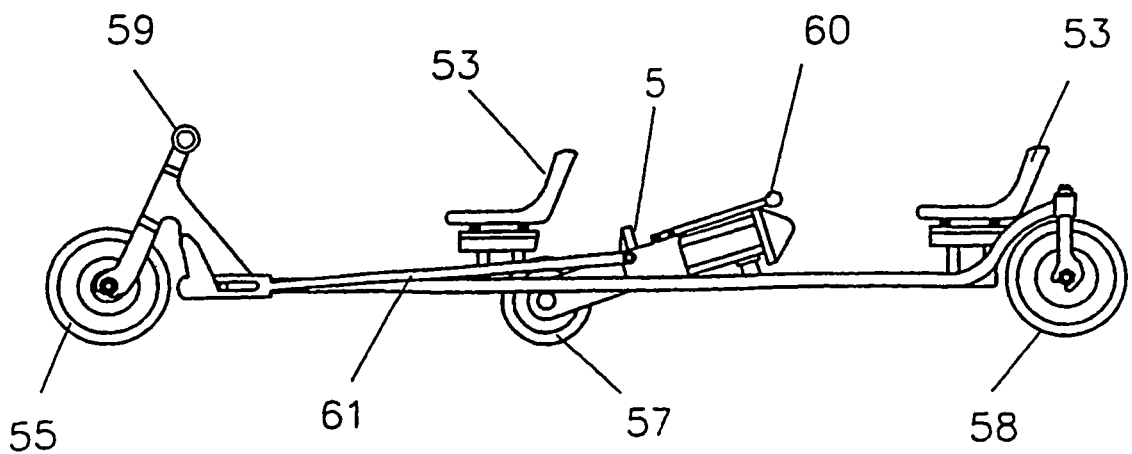
FIG. 10 is a structural diagram of two-man driving tricycle of a second embodiment.

FIG. 10 illustrates an embodiment a fore-and-aft two-man tricycle. The regulating wheel 55 is located on the left front. The driving wheel 57 is on the right side in the middle. The follower rear wheel 58 is provided on the left side of the rear seat. In another word, the front and rear wheels are on one side and the driving wheel in the middle is on the other side. Two fore-and-aft seats are provided. The front seat rider controls the direction and pedals with his foot, thus the connecting rod 61 transmits the driving power to the sliding assembly. The rear seat rider mainly pulls the rod 60 to apply force. Two riders alternately apply force to jointly drive the tricycle forward. If necessary, the rear seat rider may help in applying force with pedaling. In fact, various two-man embodiments may be designed by utilizing the driving apparatus of this invention, for example, the design with rear regulating wheel, the design with double driving apparatus and two-man seats facing the same direction, the design with a single or double driving apparatus and two-man seats facing opposite direction, and the design with single or double driving apparatus having 4 parallel wheels.

Figure 11:
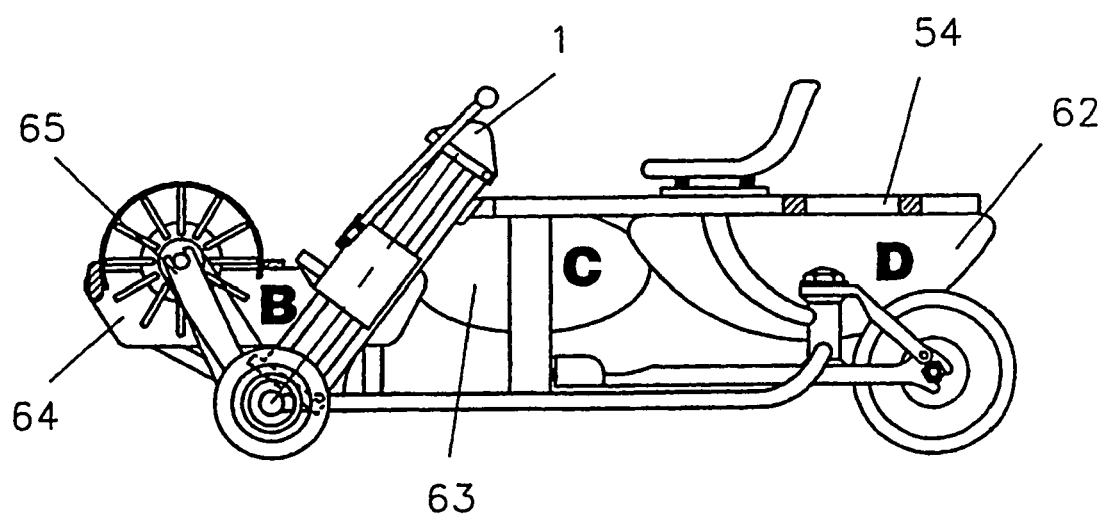
FIG. 11 is a structural diagram of amphibian bicycle of a third embodiment.

FIG. 11 illustrates a structural representation of an amphibious bicycle that incorporates a carriage 54 and wheels, with the driving apparatus 1 tilting in the front. To suit application in water, a propeller 65 driven by a chain drive is positioned on the upper front. The propeller 65 has a draft of ¼~⅙ of the propeller diameter. Three pairs of buoys are set in the front, middle and rear parts of the carriage on the left and right sides. They are the front buoys 64, side buoys 63 and main (rear) buoys 62, respectively. The side buoys 63 are fixed on both sides of carriage with the supporting litter that incorporate hinges to retract buoys. The buoys at position B, C and D are omitted on one side in the figure.

As indicated above, many products with different structures can be developed utilizing the driving apparatus of this invention. Such arrangements also include: adding an additional chain drive, utilizing leverage or hydraulic transmission, using multiple driving apparatus and different seating postures. Since there may be many varieties, this invention has an excellent future in practical application.

What is claimed is:

1. A tractive linear reciprocating driving apparatus comprising:
    a frame of the driving apparatus composed of a guide column, an auxiliary frame pillar and frame end plates, two opposite ends of the frame equipped with a flywheel and a slave sprocket, respectively, with a single endless chain operatively connected therebetween to form a chain ring, the guide column and the auxiliary frame pillar positioned on a plane that is parallel to the endless chain ring plane; and
    a sliding assembly used for driving and a slave chain-engaging and reversing mechanism thereof mounted on the guide column,
    the sliding assembly having upper and lower slide bars mounted on the guide column for sliding along the guide column, at least one pedal and at least one hand-controlled rod used for propulsion mounted on an outside butt plate of the sliding assembly;
    wherein:
        a chain engagement means of said slave chain-engaging and reversing mechanism is positioned in the endless chain ring plane, said chain engagement means being connected with upper and lower slave slide bars that are mounted on the guide column, a chain engaging tooth plate being provided in the chain engagement means and one end of the chain engaging tooth plane being operably connected with the sliding assembly via connecting pieces including a pull-up rod, a pull-down rod and a nose of a connecting rod; two chain-engaging teeth positioned on the chain engaging tooth plate; said two chain-engaging teeth tilted towards two opposite directions and alternatively engaging the endless chain, in cooperation with a chain-retaining board having a chain-retaining arc projection;
        a reversing compensation means used with the slave chain-engaging and reversing mechanism has a resilient member that can contact a front surface of a chain tooth on the flywheel or the slave sprocket directly in inverse direction, and a space or clearance is reserved for movement.

2. The tractive linear reciprocating driving apparatus according to claim 1, wherein said resilient member mounted beneath the slave sprocket and an arm of the resilient member elastically contacts the front surface of a chain tooth of the slave sprocket.

3. The tractive linear reciprocating driving apparatus according to claim 1, wherein said reversing compensation means is a modified single-stage flywheel in which there is a structural member for transmission of force between a leaf spring and a chain tooth of the flywheel, the leaf spring pressing a rear end of a jack located near an inner periphery of the flywheel to make the jack firstly elastically contact a front surface of trapezoid shape rackets on the inner periphery of the flywheel and then indirectly contact the front surface of a chain tooth on an outer hull of the flywheel.

4. A tractive linear reciprocating driving apparatus comprising:
    a frame of the driving apparatus composed of a guide column in parallel with an auxiliary frame pillar, and two parallel frame end plates in perpendicular position connecting both ends of the guide column and the auxiliary frame pillar to form a generally rectangular shape, two opposite ends of frame equipped with a flywheel and a slave sprocket, respectively, with a single endless chain operatively connected therebetween to form a chain ring, the guide column and the auxiliary frame pillar positioned on a plane that is parallel to the endless chain ring plane; and
    a sliding assembly used for driving and a slave chain-engaging and reversing mechanism thereof mounted on the guide column,
    the sliding assembly having upper and lower slide bars mounted on the guide column for sliding along the guide column, at least one pedal and at least one hand-controlled rod used for propulsion mounted on an outside butt plate of the sliding assembly;
    wherein:
        a chain engagement means of said slave chain-engaging and reversing mechanism is positioned in the endless chain ring plane, said chain engagement means being connected with upper and lower slave slide bars that are mounted on the guide column, a chain engaging tooth plate being provided in the chain engagement means and one end of the chain engaging tooth plane being operably connected with the sliding assembly via connecting pieces including a pull-up rod, a pull-down rod and a nose of a connecting rod; two chain-engaging teeth positioned on the chain engaging tooth plate; said two chain-engaging teeth tilted towards two opposite directions and alternatively engaging the endless chain in cooperation with a chain-retaining board having a chain-retaining arc projection;
        a reversing compensation means used with the slave chain-engaging and reversing mechanism has a resilient member that can contact a front surface of a chain tooth on the flywheel or the slave sprocket directly in inverse direction, and a space or clearance is reserved for movement.

* * * * *